US009690284B2

(12) United States Patent
Uenishi

(10) Patent No.: US 9,690,284 B2
(45) Date of Patent: Jun. 27, 2017

(54) MACHINE TOOL FOR CHAMFERING AND CHAMFERING METHOD

(71) Applicant: FANUC Corporation, Yamanashi (JP)

(72) Inventor: Daisuke Uenishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 411 days.

(21) Appl. No.: 14/542,786

(22) Filed: Nov. 17, 2014

(65) Prior Publication Data

US 2015/0142164 A1 May 21, 2015

(30) Foreign Application Priority Data

Nov. 19, 2013 (JP) .................................. 2013-239371

(51) Int. Cl.
| | |
|---|---|
| *G05B 19/18* | (2006.01) |
| *G05B 19/402* | (2006.01) |
| *G05B 19/19* | (2006.01) |
| *G05B 19/404* | (2006.01) |

(52) U.S. Cl.
CPC ........... *G05B 19/182* (2013.01); *G05B 19/19* (2013.01); *G05B 19/402* (2013.01); *G05B 19/404* (2013.01); *G05B 2219/34088* (2013.01)

(58) Field of Classification Search
CPC ...... G05B 19/18; G05B 19/182; G05B 19/19; G05B 19/402; G05B 19/404; G05B 2219/34088

See application file for complete search history.

(56) References Cited

U.S. PATENT DOCUMENTS

| | | | | |
|---|---|---|---|---|
| 4,628,458 A | * | 12/1986 | Ohta | .................. G05B 19/4065 318/563 |
| 5,011,345 A | * | 4/1991 | Nishigai | ................ B23Q 35/12 409/132 |
| 5,827,020 A | | 10/1998 | Fujita et al. | |
| 2010/0204814 A1 | | 8/2010 | Neumaier et al. | |
| 2014/0156056 A1 | | 6/2014 | Kotake | |

FOREIGN PATENT DOCUMENTS

| | | |
|---|---|---|
| CN | 101151122 A | 3/2008 |
| CN | 101615024 A | 12/2009 |
| CN | 102662351 A | 9/2012 |
| JP | 1-177946 A | 7/1989 |
| JP | H05-8148 A | 1/1993 |

(Continued)

OTHER PUBLICATIONS

Office Action mailed Apr. 28, 2015, corresponding to Japanese patent application No. 2013-239371.

*Primary Examiner* — Dennis M Butler
(74) *Attorney, Agent, or Firm* — Hauptman Ham, LLP

(57) ABSTRACT

After a Z-axis on which a chamfering tool is mounted is located in a machining position for chamfering, two orthogonal axes (X- and Y-axes) perpendicular to the Z-axis are positioned to be ready for the chamfering. The Z-axis is compensated simultaneously with the X- and Y-axes in accordance with a machining path in a machining program, based on tool data, whereby the entire cutting edge of the chamfering tool can be used for each chamfering cycle. Specifically, the radius of the tool is made variable so that a chamfering area can cover the entire cutting edge of the tool.

8 Claims, 9 Drawing Sheets

(56) References Cited

FOREIGN PATENT DOCUMENTS

| | | | |
|---|---|---|---|
| JP | 6-285748 | A | 10/1994 |
| JP | 9-29584 | A | 2/1997 |
| JP | 10-277911 | A | 10/1998 |
| JP | 2004-58190 | A | 2/2004 |
| JP | 2010-228092 | A | 10/2010 |
| WO | 2013/015124 | A1 | 1/2013 |

* cited by examiner

FIG. 2A
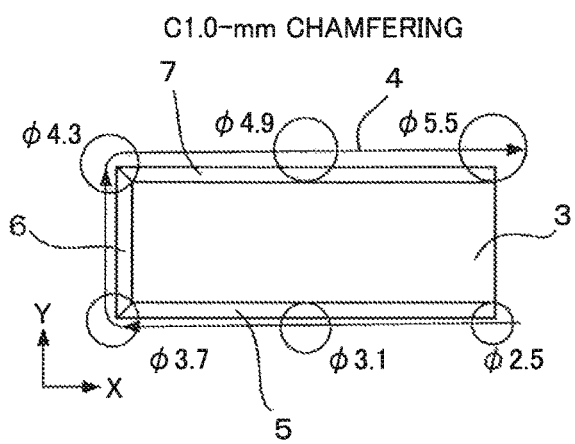
FIG. 2B
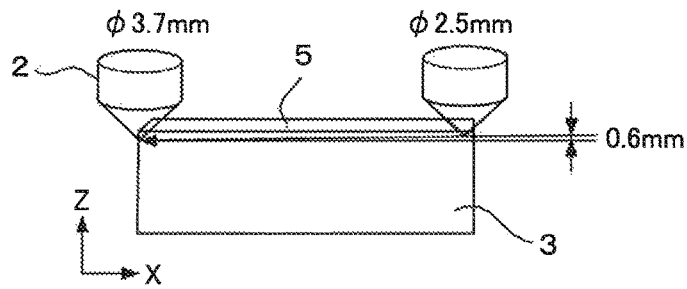
FIG. 2C
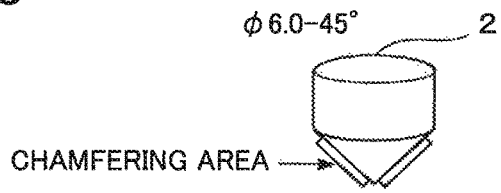
FIG. 3
1. PERFORM OPERATION FOR VARYING TOOL RADIUS VALUE IN RESPONSE TO MOVE COMMAND
2. ALSO VARY ROTATIONAL FREQUENCY AND FEED RATE TO KEEP PERIPHERAL SPEED CONSTANT ACCORDING TO TOOL RADIUS VALUE
3. SIMULTANEOUSLY VARY POSITION IN TOOL AXIS DIRECTION TO MAINTAIN COMMANDED CHAMFERING AMOUNT
|  | S | F |
| --- | --- | --- |
| φ2.5 | 3821 | 382 |
| ~φ3.1 | ~3081 | ~308 |
| ~φ3.7 | ~2582 | ~258 |
| ~φ4.3 | ~2221 | ~222 |
| ~φ4.9 | ~1949 | ~195 |
| ~φ5.5 | ~1737 | ~174 |

FIG. 4

CHAMFERING PROGRAM FORMAT

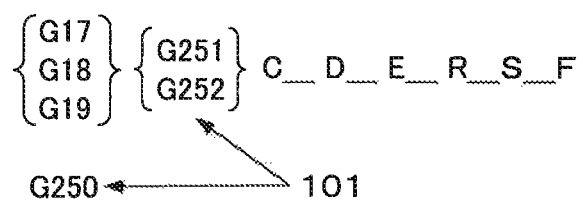

G250 ← ———→ 101

| | |
|---|---|
| G17 | : XY-PLANE DESIGNATION |
| G18 | : ZX-PLANE DESIGNATION |
| G19 | : YZ-PLANE DESIGNATION |
| G250 | : CHAMFERING OPTIMIZATION FUNCTION   OFF |
| G251 | : CHAMFERING OPTIMIZATION FUNCTION   ON (LEFT) |
| G252 | : CHAMFERING OPTIMIZATION FUNCTION   ON (RIGHT) |
| C | : CHAMFERING AMOUNT  (mm) |
| D | : INITIAL TOOL DIAMETER (mm) |
| E | : FINAL TOOL DIAMETER  (mm) |
| R | : TOOL TIP ANGLE, CHAMFERING ANGLE (deg) |
| S | : REFERENCE ROTATIONAL FREQUENCY (rpm) |
| F | : REFERENCE FEED RATE (mm/min) |

PROGRAM EXAMPLE
(☐50mm×25mm, C1.0mm MACHINING PROGRAM)

O0002
G49 M6 T01
G90 G00 G54 X55. Y0
G43 Z0. H001
M3 S3821

G17 G251 C1.0 D2.5 E5.5 R90. S3821 F382   ⋯ FUNCTION ON — 101
G01 X50. F382
X0.
Y25.
X50.
G250                                       ⋯ FUNCTION OFF

G00 X55.                                                      — 102

G91 G28 Z0
G28 X0 Y0

M30

FIG. 7A
MACHINING CONDITIONS FOR C1.0-mm
MACHINING AT φ3.0 PORTION OF 50 mm × 25
mm MATERIAL BY φ6.0-45° CHAMFERING
TOOL
V=30m/min, f=0.1mm/rev
S=3184rpm, F-318mm/min
FIG. 7B
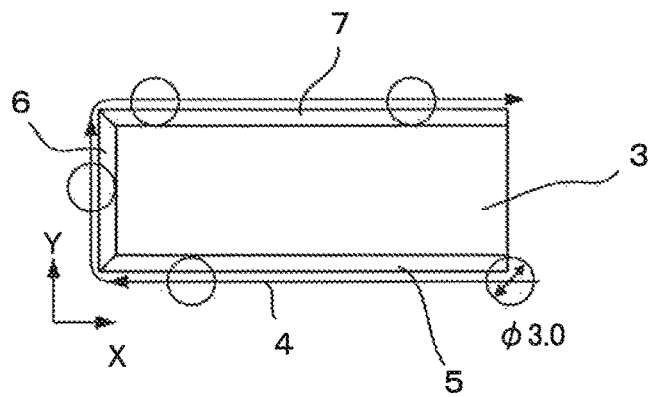
FIG. 7C
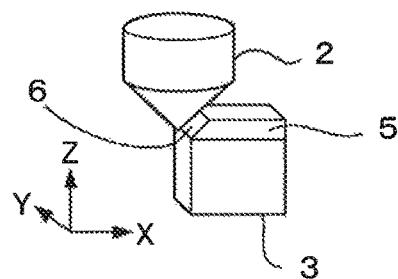
FIG. 7D
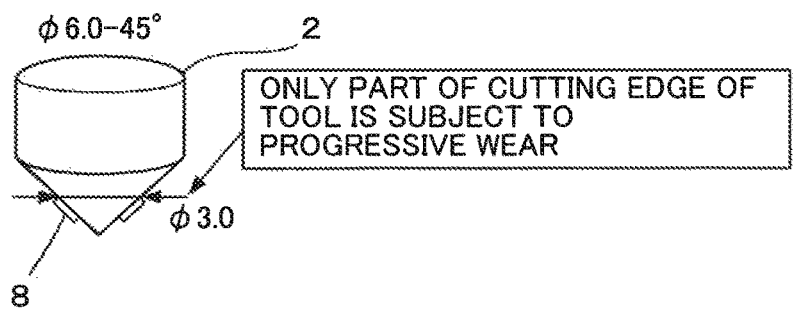

<1> MACHINING FREQUENCY NOT HIGHER THAN
'<1> LIFESPAN FREQUENCY'
·CHAMFERING AT φ5.0 PORTION
·TOOL LENGTH COMPENSATION H001
·TOOL DIAMETER COMPENSATION D001

<2> MACHINING FREQUENCY NOT HIGHER THAN
'<2> LIFESPAN FREQUENCY'
·CHAMFERING AT φ3.0 PORTION
·TOOL LENGTH COMPENSATION H002
·TOOL DIAMETER COMPENSATION D002

FIG. 9

```
#600                ···CUMULATIVE MACHINING FREQUENCY

PROGRAM EXAMPLE (C1.0-mm MACHINING PROGRAM)
O0001
...
#500=10000.        ···<1> LIFESPAN FREQUENCY (TIME)
#510=20000.        ···<2> LIFESPAN FREQUENCY (TIME)
#501=1.            ···φ5.0 COMPENSATION NO.
#502=2.            ···φ3.0 COMPENSATION NO.
#503=1911.         ···φ5.0 ROTATIONAL FREQUENCY S (rpm)
#504=3184.         ···φ3.0 ROTATIONAL FREQUENCY S (rpm)
#505=191.          ···φ5.0 FEED RATE F (mm/min)
#506=318.          ···φ3.0 FEED RATE F (mm/min)

IF[#600LE#500]GOTO001    ···CONDITIONAL BRANCH <1>
IF[#600LE#510]GOTO002    ···CONDITIONAL BRANCH <2>
#3000=1.(TOOL LIFE END)  ···TOOL LIFESPAN

N001               ···φ5.0 COMPENSATION NO., CONDITION INPUT
H#501 D#501 S#503 F#505
GOTO003

N002               ···φ3.0 COMPENSATION NO., CONDITION INPUT
H#502 D#502 S#504 F#506
GOTO003

N003               ···MACHINING PROGRAM
G49 M6 T01
G90 G00 G54 X55. Y0
G43 Z0.
G41 G1 X50.
Y25.
X50.
G40 X55.
#600=#600+1.       ···CALCULATION FORMULA FOR CUMULATIVE
M30                   MACHINING FREQUENCY
```

MACHINE TOOL FOR CHAMFERING AND CHAMFERING METHOD

RELATED APPLICATIONS

The present application claims priority to Japanese Application Number 2013-239371, filed Nov. 19, 2013, the disclosure of which is hereby incorporated by reference herein in its entirety.

BACKGROUND OF THE INVENTION

Field of the Invention

The present invention relates to a machine tool configured to chamfer corners of a workpiece and a chamfering method.

Description of the Related Art

Conventionally, corners of a workpiece are chamfered by means of a machine tool comprising a spindle and a table to which a workpiece is secured. The spindle is secured to a certain linear movement axis, the table is moved along two or more linear movement axes, and the spindle and the table are controlled by a numerical controller. As shown in FIGS. 7A to 7D, the corner chamfering is performed based on the motion of two linear movement axes (X- and Y-axes) perpendicular to the axial direction (Z-axis direction) of a tool with a linear movement axis in the axial direction fixed.

(I) First, machining conditions for the case where a workpiece 3 is chamfered to a depth of 1.0 mm by means of a 45°-chamfering tool 2 with a maximum diameter of $\phi 6.0$ mm are set, as shown in FIG. 7A.

(II) Then, the workpiece 3 is chamfered in the set machining conditions, as shown in FIGS. 7B and 7C.

(III) That part of the cutting edge of the chamfering tool 2 used for actual cutting at three chamfered portions 5, 6 and 7 of the workpiece 3 shown in FIG. 7B is a portion with a diameter of $\phi 3.0$ mm.

In the machining method described above, the same part (chamfering area 8 shown in FIG. 7D) of the cutting edge of the chamfering tool 2 is always used for chamfering, so that it is solely subject to progressive wear, as shown in FIG. 7D. Even if the cutting edge of the chamfering tool 2 used still includes a usable part when it reaches the end of its useful life, therefore, the tool 2 cannot be used with a machining program for the workpiece 3. Accordingly, the program or tool length and diameter compensation values must be modified, so that high-efficiency automation cannot be achieved for mass-produced parts and the like.

Thus, according to the machining method described above, an expert programmer must create complicated programs, and a change of the lifespan value due to a change of the shape, tool material, or coating requires a substantial program change. Although this method ensures an improvement in tool lifespan, it lacks in versatility.

In some cases, therefore, a method of tool lifespan improvement may be adopted in which the tool length and diameter are changed in a program, depending on a set lifespan frequency, so that the position of contact of the cutting edge with the workpiece 3 can be shifted to increase the number of times of usage for each chamfering tool, as shown in FIGS. 8A to 8C, 9 and 10.

If the machining frequency is not higher than "<1> lifespan frequency", the diameter of the chamfering tool 2 at the chamfering area 8 is set to $\phi 5.0$ mm, as shown in FIG. 8A. If the machining frequency is not higher than "<2> lifespan frequency", the diameter of the chamfering tool 2 at the chamfering area 8 is set to $\phi 3.0$ mm, as shown in FIG. 8B.

FIG. 8C illustrates chamfering areas 8 with tool diameters of $\phi 5.0$ mm and $\phi 3.0$ mm.

As shown in FIG. 9, (1) a calculation formula (#600=#600+1) for accumulating the machining frequency, (2) a calculation formula for comparing a preset tool lifespan frequency and the machining frequency and modifying the tool length and diameter compensation values in the machining program (conditional branches <1> and <2>), and (3) a calculation formula for resetting the rotational frequency of the spindle on which the tool is mounted and a feed rate, based on the tool diameter modified to maintain a constant machining peripheral speed so that the machining frequency quality cannot be changed by the modification of the tool diameter compensation value are inserted into a machining program (O0001) for chamfering (N001 and N002). In this way, the number of times of usage of the chamfering tool can be increased to improve the lifespan of each tool. The machining peripheral speed is a cutting speed (m/min) at the outer diameter of the tool in contact with the workpiece to be machined.

According to the machining method shown in FIGS. 8A to 8C, 9 and 10, however, an expert programmer's programming is required, and machining conditions are modified to stabilize the machining quality, so that the machining time is not fixed. Further, a change of the shape or tool material requires a program change by an expert programmer. Thus, this method lacks in versatility.

On the other hand, Japanese Patent Application Laid-Open No. 5-8148 discloses a technique to improve tool lifespan by using the entire area of a circular-arc-shaped cutting edge of a tool in a machine tool comprising at least three controllable axes. The entire cutting edge can be used by changing the posture of the tool relative to a workpiece. However, this technique is only applicable to machining using tools with a circular-arc-shaped cutting edge, and moreover, to a machine tool with a rotating shaft capable of changing the tool posture relative to the workpiece during the machining.

SUMMARY OF THE INVENTION

Accordingly, the object of the present invention is to provide a machine tool for chamfering, having at least three linear movement axes and capable of extending the lifespan of a chamfering tool for chamfering corners of a workpiece, and a chamfering method.

A machine tool according to the present invention comprises at least three linear movement axes and a numerical controller for controlling the linear movement axes and performs corner chamfering on a plane according to a machining program. This machine tool comprises a storage unit configured to store an amount of chamfering by a chamfering tool and data on the chamfering tool, an analysis unit configured to analyze the machining program, a total machining distance calculation unit configured to calculate a sum total of machining distances in the machining program analyzed by the analysis unit, a chamfering compensation amount calculation unit configured to calculate a tool radius compensation amount and a tool axis compensation amount in accordance with a distance from a machining starting point of the chamfering tool such that the chamfering is performed while changing a chamfering area of the chamfering tool, based on the calculated sum total of the machining distances and the tool data, and a chamfering compensation unit configured to perform tool radius compensation and tool axis compensation in accordance with the distance from the machining starting point of the chamfering tool, based on the calculated tool radius compensation amount and tool axis compensation amount.

The at least three linear movement axes may include a linear movement axis for moving a spindle and two or more linear movement axes for moving a table to which a workpiece is secured.

The at least three linear movement axes may include an axis or axes for moving a table to which a workpiece is secured or a spindle head to which a spindle is secured.

The chamfering compensation unit may comprise a reference machining condition calculation unit configured to calculate a machining condition for keeping a peripheral speed constant, based on the tool radius compensation amount calculated by the reference machining condition calculation unit, and a machining condition changing unit configured to change the machining condition based on the machining condition calculated by the reference machining condition calculation unit.

In a method for performing corner chamfering on a plane according to a machining program by means of a machine tool according to the present invention, the machine tool comprises at least three linear movement axes and a numerical controller for controlling the linear movement axes and performs corner chamfering on a plane according to a machining program. Further, the method comprises a step of storing an amount of chamfering by a chamfering tool and data on the chamfering tool, a step of analyzing the machining program, a step of calculating a sum total of machining distances in the analyzed machining program, a step of calculating a tool radius compensation amount and a tool axis compensation amount in accordance with a distance from a machining starting point of the chamfering tool such that the chamfering is performed while changing a chamfering area of the chamfering tool, based on the calculated sum total of the machining distances and the tool data, and a step of performing tool radius compensation and tool axis compensation in accordance with the distance from the machining starting point of the chamfering tool, based on the calculated tool radius compensation amount and tool axis compensation amount.

The step of performing the tool radius compensation and the tool axis compensation may further comprise calculating a machining condition for keeping a peripheral speed constant, based on the tool radius compensation amount calculated from the stored chamfering tool data, and changing the machining condition based on the calculated machining condition.

According to the present invention, there can be provided a machine tool for chamfering, having at least three linear movement axes and capable of extending the lifespan of a chamfering tool for chamfering corners of a workpiece, and a chamfering method.

BRIEF DESCRIPTION OF THE DRAWINGS

The above and other objects and features of the present invention will be obvious from the ensuing description of embodiments with reference to the accompanying drawings, in which:

FIGS. 2A to 2C are diagrams illustrating corner chamfering of a workpiece by means of the machine tool of the present invention controlled by the numerical controller of FIG. 1;

FIG. 3 is a diagram illustrating an operation for varying the radius value of a tool in response to a move command;

FIG. 4 is a diagram illustrating a format of a chamfering program based on the use of the entire cutting edge of the tool;

FIGS. 7A to 7D are diagrams illustrating a conventional example of corner chamfering;

FIG. 9 is a diagram illustrating an example of the macro-program for performing corner chamfering shown in FIGS. 8A to 8C.

DETAILED DESCRIPTION OF THE PREFERRED EMBODIMENTS

Figure 1:
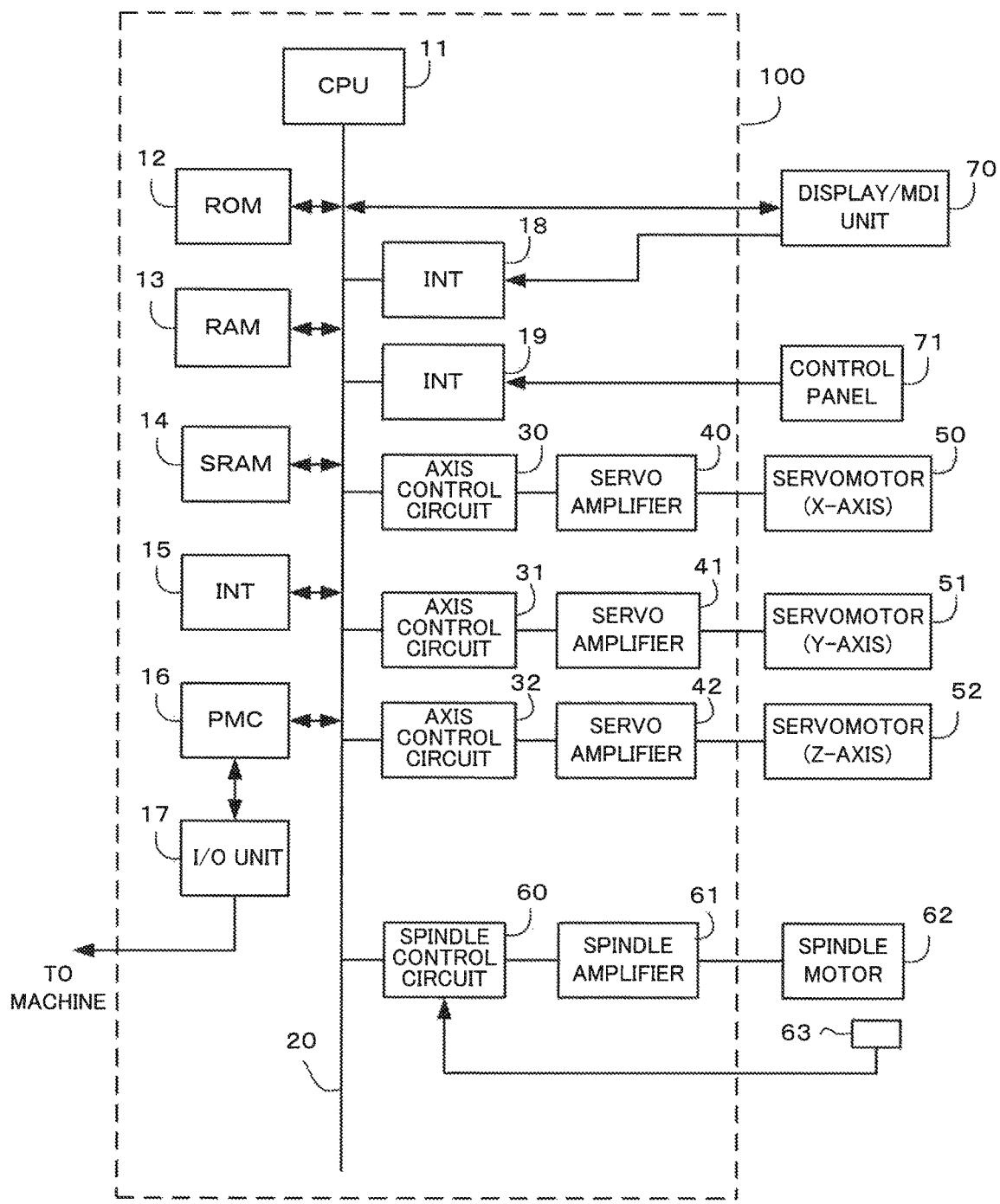
FIG. 1 is a block diagram illustrating a numerical controller for controlling a machine tool with at least three linear movement axes.

First, a numerical controller for controlling a machine tool with at least three linear movement axes will be described with reference to FIG. 1.

A numerical controller 10 is a device configured to control a machine tool (not shown) to machine a workpiece (not shown). A CPU 11 is a processor for generally controlling the numerical controller 10. The CPU 11 reads a system program stored in a ROM 12 through a bus 20 and generally controls the numerical controller 10 according to the read system program. A RAM 13 is stored with temporary calculation data, display data, and various other data input by an operator through a display/manual data input (MDI) unit 70. An SRAM memory 14 is constructed as a nonvolatile memory that can maintain a storage state even after the numerical controller 10 is switched off. The SRAM memory 14 is preloaded with various system programs for performing necessary edit mode processing for the creation and editing of a machining program and processing for automatic operation.

On receiving move commands for the individual axes from the CPU 11, axis control circuits 30, 31 and 32 for the individual axes output axis commands to servo amplifier 40, 41 and 42, respectively. On receiving these commands, the servo amplifiers 40 to 42 drive axis servomotors 50, 51 and 52, respectively. The servomotors 50 to 52 for the individual axes incorporate position/speed sensors. Position/speed feedback signals from the position/speed sensors are fed back to the axis control circuits 30 to 32 to achieve position/speed feedback control. Position/speed feedback is not illustrated in FIG. 1.

The servomotors 50 to 52 serve to drive X-, Y-, and Z-axes, respectively, of the machine tool. A spindle control circuit 60 receives a spindle rotation command and outputs a spindle speed signal to a spindle amplifier 61. On receiving the spindle speed signal, the spindle amplifier 61 drives a spindle motor (SM) 62 at a commanded rotational speed. Speed data detected by a speed sensor 63 is fed back to the spindle control circuit 60, whereupon speed control is performed.

The numerical controller 10 described above is constructed in the same manner as a conventional one and drivingly controls a three-axis machine (machine tool according to the present invention).

The three linear movement axes controlled by the numerical controller 10 include, for example, a linear movement axis (M(Z)) along which a spindle of the machine tool for chamfering is moved and two linear movement axes (M(X), M(Y)) along which a table for securing the workpiece is moved. The table on which the workpiece is placed can be moved in two-axis directions along the two linear movement axes.

Alternatively, the table on which the workpiece is placed may be moved in three-dimensional directions along three linear movement axes with the spindle fixed or the spindle may be moved in the three-dimensional directions along the three linear movement axes with the table fixed. The three linear movement axes (M(X), M(Y), M(Z)) are controlled in the example of the numerical controller 10 shown in FIG. 1. Alternatively, however, four or more linear movement axes may be controlled.

Chamfering of corners of the workpiece using the machine tool controlled by the numerical controller 10 will now be described with reference to FIGS. 2A to 2C.

First, a chamfering tool 2 is mounted on the spindle, which is secured to the Z-axis as the linear movement axis, and the Z-axis is located in a machining position for chamfering. Then, the two orthogonal linear movement axes (X- and Y-axes) perpendicular to the Z-axis (extending in the axial direction of the tool) are positioned to be ready for the chamfering.

Based on tool data on the chamfering tool 2 used, as shown in FIGS. 2A to 2C, the linear movement axis (Z-axis) on which the chamfering tool 2 is mounted and the two orthogonal linear movement axes (X- and Y-axes) perpendicular to the axial direction (Z-axis direction) of the tool 2 are simultaneously compensated in accordance with a machining path in the machining program. In this way, the entire cutting edge of the chamfering tool can be used for each chamfering cycle, so that the tool lifespan can be improved.

FIG. 2A shows how a workpiece 3 is chamfered by means of the chamfering tool 2. A chamfered portion 5 of the workpiece 3 is machined in such a manner that the tool diameter changes from ϕ2.5 to ϕ3.7 mm. A chamfered portion 6 is machined in such a manner that the tool diameter changes from ϕ3.7 to ϕ4.3 mm. A chamfered portion 7 is machined in such a manner that the tool diameter changes from ϕ4.3 to ϕ5.5 mm.

FIG. 2B is a front view illustrating how the chamfered portion 5 of the workpiece 3 is chamfered. A chamfering area can be made to cover the entire cutting edge of the chamfering tool 2 by varying the tool radius of the tool.

As shown in FIG. 3, moreover, stable machining quality can be achieved by changing the rotational frequency and the feed rate as the movement axes (X- and Y-axes) are moved, thereby maintaining a constant machining peripheral speed, in accordance with the diameter of the tool that contacts the workpiece 3 during the chamfering work. The machining peripheral speed is a cutting speed at the outer diameter of the tool in contact with the workpiece. The rotational frequency is calculated from the peripheral speed or cutting speed and the outer diameter of the contacting tool.

Figures 5A, 5B:
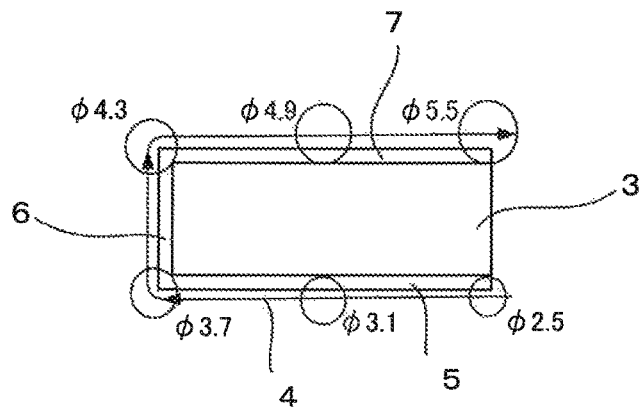
FIGS. 5A and 5B are diagrams illustrating the chamfering program of FIG. 4.

In order to achieve the machining described above, the numerical controller 10 should be stored with "necessary data" for the simultaneous compensation of the linear movement axes and the maintenance of the constant machining peripheral speed, as shown in FIGS. 4, 5A and 5B. The "necessary data" include G: data on the direction of tool diameter compensation and data on the axial direction of the tool,
C: data on a chamfering amount,
D: data on an initial tool diameter,
E: data on a final tool diameter,
R: data on a tip angle (chamfering angle),
S: data on a reference rotational frequency, and
F: data on a reference feed rate.

According to FIGS. 4, 5A and 5B, the necessary tool data are stored in the numerical controller 10 by commanding a program code 101 previously defined as a chamfering program format, based on a G-code, ahead of a chamfering locus 102. At the same time, the program code 101 serves to turn the function ON. After commanding the chamfering locus 102 is finished, a G-code for turning the function OFF is inserted.

FIG. 4 shows the program code 101 of the chamfering program format G-code-commanded by the chamfering program. G-codes G17 to G19 and G250 to G252 represent commands such as those shown in FIG. 4. Those commands are given by way of example only.

Figure 6:
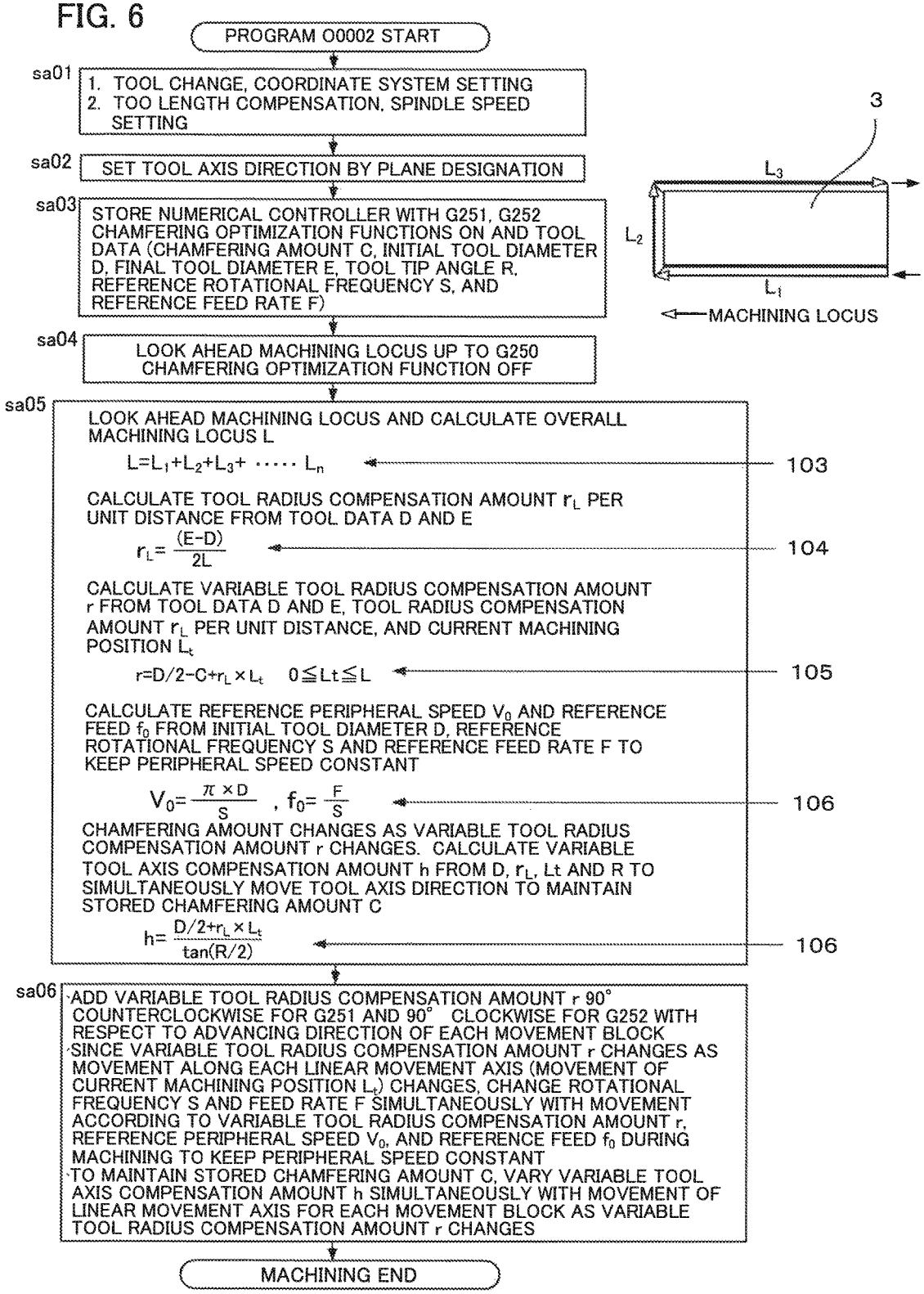
FIG. 6 is a flowchart showing a chamfering program O0002 of FIG. 5A.
Figure 8A:
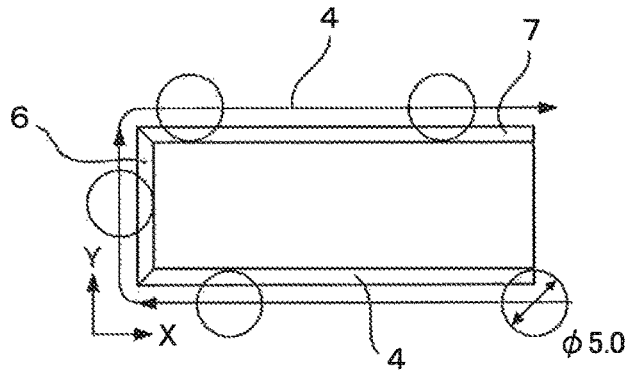
FIGS. 8A to 8C are diagrams illustrating an example of chamfering with a high efficiency of C1.0 mm based on a macro-program.
Figure 8B:
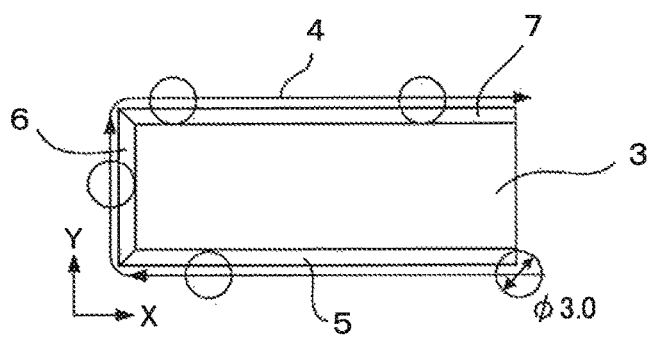
Figure 8C:
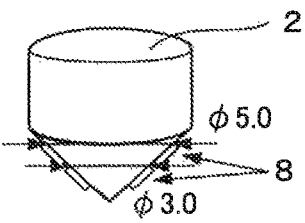
Figure 10:
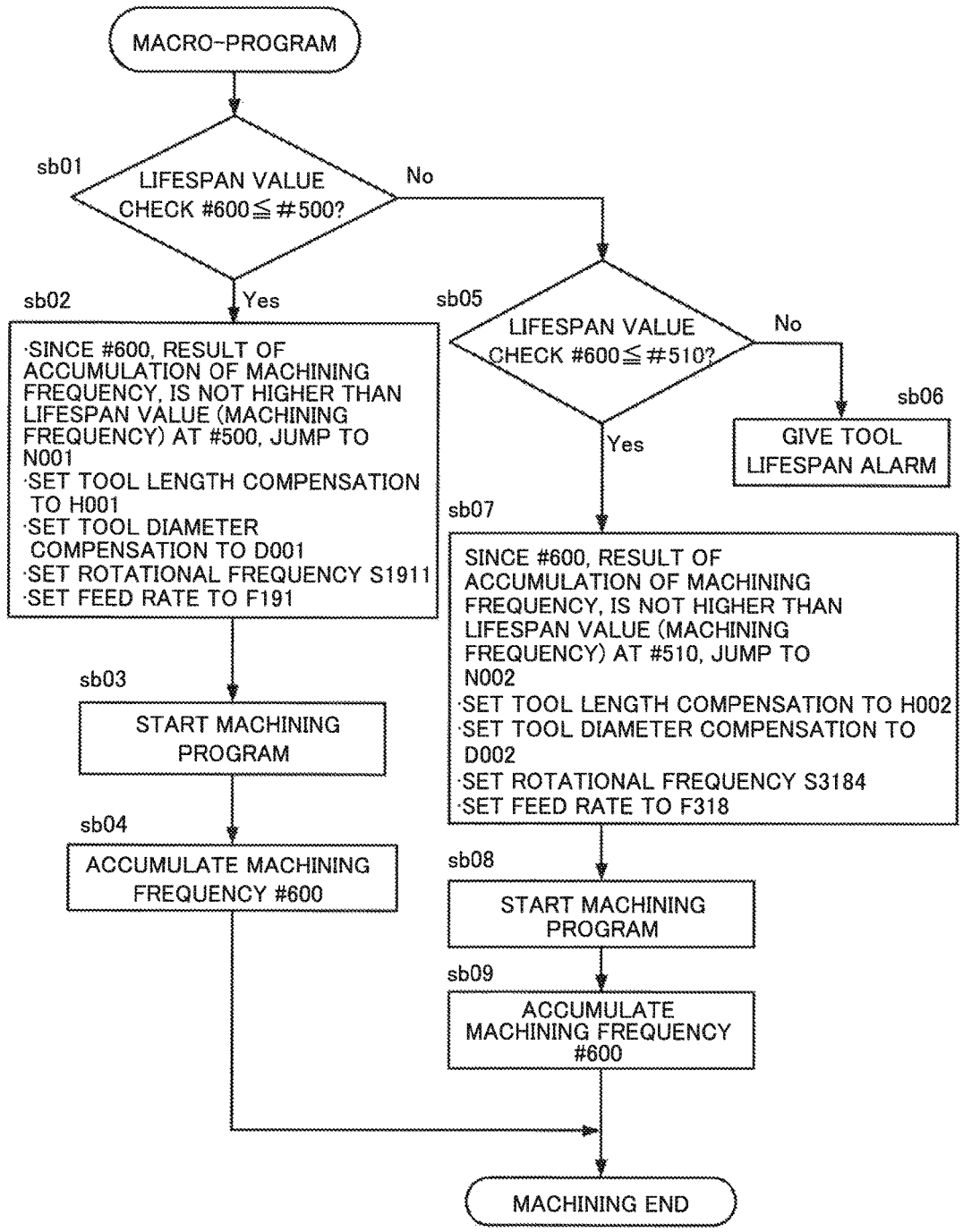
FIG. 10 is a flowchart of the macro-program of FIG. 9.

Based on the tool data stored as shown in FIGS. 4, 5A and 5B and the function turned ON, the chamfering locus 102 commanded on a program (O0002) is looked ahead, as shown in FIG. 6. An overall machining locus L, the sum of the amounts of movement of the two orthogonal linear movement axes (X- and Y-axes) perpendicular to the axial direction (Z-axis direction) of the commanded tool, is calculated based on the look-ahead of the chamfering locus 102.

Based on the tool data (initial tool diameter D and final tool diameter E) stored in the numerical controller 10 and the overall machining locus L, a tool radius compensation amount $r_L$ per unit distance is calculated as follows:

$$r_L = (E-D)/2L.$$

A current machining position $L_t$ ranges from 0 to L both inclusive ($0 \leq L_t \leq L$).

A variable tool radius compensation amount r changes as the current machining position $L_t$ changes. The chamfering amount changes as the variable tool radius compensation amount r changes. If the rotational frequency is kept at the reference value, however, the peripheral speed varies, so that the machining quality inevitably undergoes a deviation. Thus, based on the initial tool diameter D, reference rotational frequency S, and reference feed rate F, a reference peripheral speed $V_0$ and a reference feed $f_0$, as reference cutting conditions 106, are calculated as follows:

$$V_0 = \pi \times D/S,$$

$$f_0 = F/S.$$

Since the chamfering amount changes as the variable tool radius compensation amount r changes, moreover, compensation in the axial direction (Z-axis direction) of the chamfering tool 2 is required. Thus, based on the tool radius compensation amount $r_L$ per unit distance, current machining position $L_t$, stored initial tool diameter D, and tool tip angle R, a variable tool axis compensation amount h is calculated as follows:

$$h = (D/2 + r_L \times L_t)/\tan(R/2).$$

Based on the variable tool radius compensation amount r, reference cutting conditions 106, and variable tool axis compensation amount h, the variable tool radius compensation amount r is compensated on an XY-plane in accordance with respective move commands for the two orthogonal linear movement axes (X- and Y-axes). At the same time, the variable tool axis compensation amount h is compensated in the axial direction (Z-axis direction) perpendicular to the XY-plane. Further, for achieving a stable machining quality even though the variable tool radius compensation amount r changes, machining is performed while changing the rotational frequency and the feed rate based on the reference cutting conditions 106 in order to keep the machining peripheral speed constant. In this way, the tool lifespan can be improved.

According to the present invention:

the data on the chamfering tool 2 is stored in the numerical controller 10 during the chamfering on the XY-plane perpendicular to the axial direction (Z-axis direction) of the commanded tool, and the machining locus commanded on the program is looked ahead, the variable tool radius compensation amount r for each movement block, the reference peripheral speed $V_0$ and the reference feed $f_0$, as the reference cutting conditions 106, and the variable tool axis compensation amount h are calculated from the stored tool data, the variable tool radius compensation amount r is added to the amount of movement as the linear movement axes (X- and Y-axes) move on the commanded XY-plane, the rotational frequency and the feed rate are changed based on the reference peripheral speed $V_0$ and the reference feed $f_0$ as the variable tool radius compensation amount r changes, and compensation based on the variable tool axis compensation amount h is performed with respect to the axial direction (Z-axis direction) of the tool perpendicular to the commanded XY-plane so that machining is performed with the chamfering amount maintained.

In this way, the machining quality can be stabilized by maintaining the reference peripheral speed $V_0$ and the peripheral speed for the reference feed $f_0$, and the tool lifespan can be improved by using the entire cutting edge of the chamfering tool.

The chamfering program (O0002) of FIG. 5A will be described with reference to the flowchart of FIG. 6.

[Step sa01] Tool change, coordinate system setting, tool length compensation, and spindle speed setting are performed.

[Step sa02] The axial direction (Z-axis direction) of the tool based on plane (XY-plane) designation is set.

[Step sa03] "G251: chamfering optimization function ON", "G252: chamfering optimization function ON", and tool data (chamfering amount C, initial tool diameter D, final tool diameter E, tool tip angle R, reference rotational frequency S, and reference feed rate F) are stored in the numerical controller.

[Step sa04] A machining locus leading up to "G250: chamfering optimization function OFF" is looked ahead.

[Step sa05] The machining locus is looked ahead and the overall machining locus L is calculated as follows:

$$L=L_1+L_2+L_3+\ldots +L_n.$$

Further, the tool radius compensation amount $r_L$ per unit distance is calculated from the overall machining locus L and the tool data including the initial tool diameter D and the final tool diameter E.

$$r_L=(E-D)/2L.$$

The variable tool radius compensation amount r is calculated from the chamfering amount C, initial tool diameter D, tool radius compensation amount $r_L$ per unit distance, and current machining position $L_t$ (position of each movement block in movement based on the overall machining locus L) as follows:

$$r=D/2-C+r_1\times L_t$$

$$(0\leq L_t\leq L).$$

In order to keep the peripheral speed constant, the reference peripheral speed $V_0$ and the reference feed $f_0$ are calculated from the initial tool diameter D, reference rotational frequency S, and reference feed rate F as follows:

$$V_0=\pi\times D/S,$$

$$f_0=F/S.$$

The chamfering amount changes as the variable tool radius compensation amount r changes. To maintain the stored chamfering amount C, the axial position of the tool must also be moved at the same time. Thus, based on the initial tool diameter D, unit tool radius compensation amount $r_L$, current machining position $L_t$, and tool tip angle R, the variable tool axis compensation amount h is calculated as follows:

$$h=(D/2+r_1\times L_t)/\tan(R/2).$$

[Step sa06] The variable tool radius compensation amount r is added 90 degrees counterclockwise (to the left-hand side) for G251 and 90 degrees clockwise (to the right-hand side) for G252, with respect to the advancing direction of each movement block.

The variable tool radius compensation amount r changes as the movement along each linear movement axis, that is, the movement of the current machining position $L_t$, changes. Thus, in order to keep the peripheral speed constant, the rotational frequency S and the feed rate F are simultaneously changed based on the variable tool radius compensation amount r, reference peripheral speed $V_0$, and reference feed $f_0$ during the machining. To maintain the stored chamfering amount C, moreover, the variable tool axis compensation amount h is changed simultaneously with the movement of the linear movement axis for each movement block as the variable tool radius compensation amount r changes.

The invention claimed is:

1. A machine tool which comprises at least three linear movement axes and a numerical controller for controlling the linear movement axes and performs corner chamfering on a plane according to a machining program, the machine tool for chamfering comprising:

a storage unit configured to store an amount of chamfering by a chamfering tool and data on the chamfering tool;

an analysis unit configured to analyze the machining program;

a total machining distance calculation unit configured to calculate a sum total of machining distances in the machining program analyzed by the analysis unit;

a chamfering compensation amount calculation unit configured to calculate a tool radius compensation amount and a tool axis compensation amount based on the calculated sum total of machining distances, the data on the chamfering tool, and a distance from a machining starting point of the chamfering tool, such that the chamfering is performed while changing a chamfering area of the chamfering tool; and a chamfering compensation unit configured to perform tool radius compensation and tool axis compensation in accordance with the distance from the machining starting point of the chamfering tool, based on the calculated tool radius compensation amount and tool axis compensation amount.

2. The machine tool according to claim 1, wherein the at least three linear movement axes include a linear movement axis for moving a spindle and two or more linear movement axes for moving a table to which a workpiece is secured.

3. The machine tool according to claim 1, wherein the at least three linear movement axes include an axis or axes for moving a table to which a workpiece is secured or a spindle head to which a spindle is secured.

4. The machine tool according to claim 1, wherein the chamfering compensation unit comprises a reference machining condition calculation unit configured to calculate a machining condition for keeping a peripheral speed constant, based on the tool radius compensation amount calculated by the reference machining condition calculation unit, and a machining condition changing unit configured to change the machining condition based on the machining condition calculated by the reference machining condition calculation unit.

5. A method for performing corner chamfering on a plane according to a machining program by means of a machine tool,
the machine tool comprising at least three linear movement axes and a numerical controller for controlling the linear movement axes and being configured to perform corner chamfering on a plane according to a machining program,
the method comprising:
a step of storing an amount of chamfering by a chamfering tool and data on the chamfering tool;
a step of analyzing the machining program;
a step of calculating a sum total of machining distances in the analyzed machining program;
a step of calculating a tool radius compensation amount and a tool axis compensation amount based on the calculated sum total of machining distances, the data on the chamfering tool, and a distance from a machining starting point of the chamfering tool, such that the chamfering is performed while changing a chamfering area of the chamfering tool; and
a step of performing tool radius compensation and tool axis compensation in accordance with the distance from the machining starting point of the chamfering tool, based on the calculated tool radius compensation amount and tool axis compensation amount.

6. The method according to claim 5, wherein the at least three linear movement axes include a linear movement axis for moving a spindle and two or more linear movement axes for moving a table to which a workpiece is secured.

7. The method according to claim 5, wherein the at least three linear movement axes include an axis or axes for moving a table to which a workpiece is secured or a spindle head to which a spindle is secured.

8. The method according to claim 5, wherein the step of performing the tool radius compensation and the tool axis compensation further comprises calculating a machining condition for keeping a peripheral speed constant, based on the tool radius compensation amount calculated from the stored chamfering tool data, and changing the machining condition based on the calculated machining condition.

* * * * *